June 12, 1945.  G. KITTLER  2,378,144
APPARATUS FOR THE MECHANICAL LOADING OF BEETROOTS
Filed Feb. 13, 1941  3 Sheets-Sheet 1
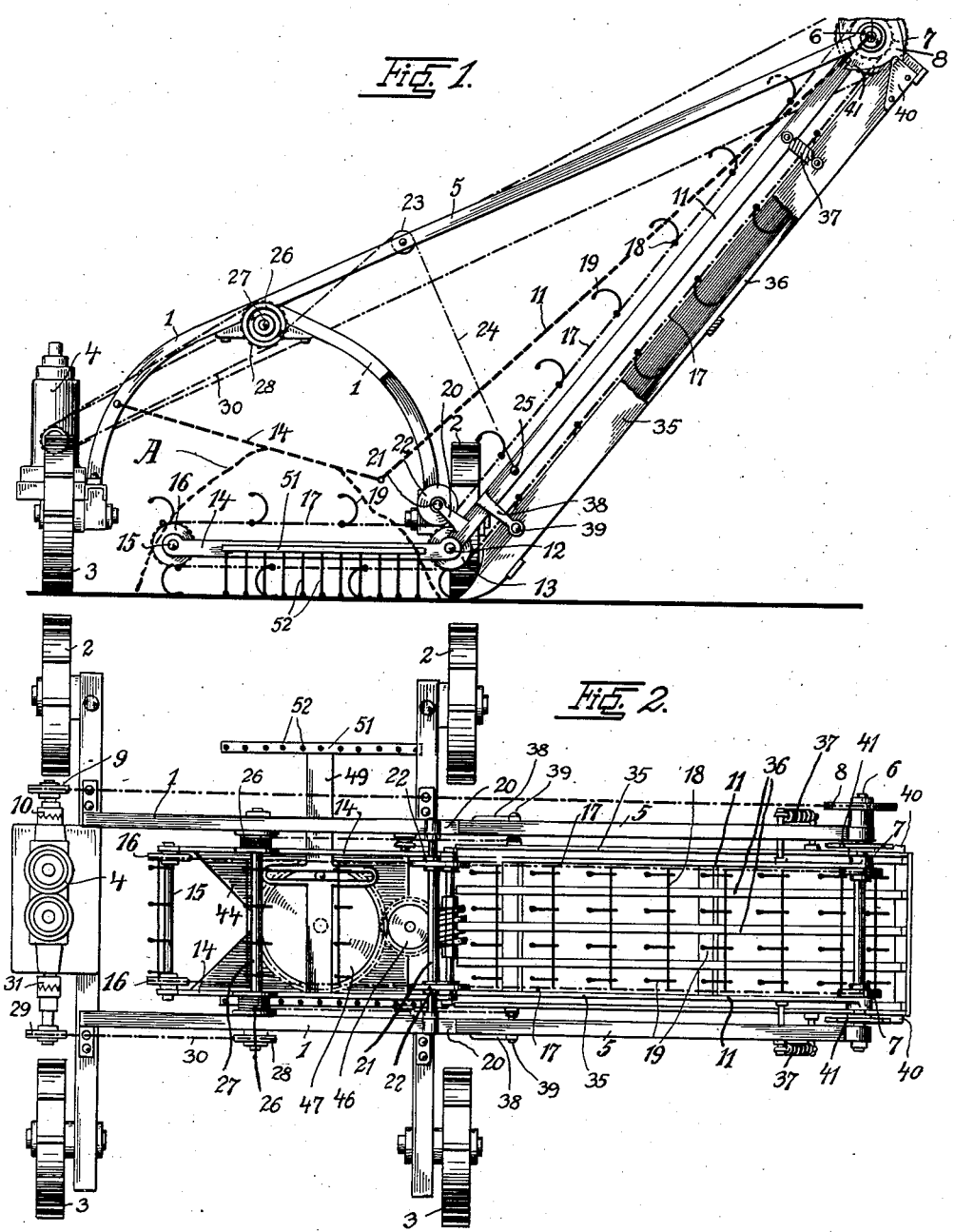

June 12, 1945.　　　　G. KITTLER　　　　2,378,144
APPARATUS FOR THE MECHANICAL LOADING OF BEETROOTS
Filed Feb. 13, 1941　　　3 Sheets-Sheet 2

Inventor
Georg Kittler

June 12, 1945.　　　　G. KITTLER　　　　2,378,144
APPARATUS FOR THE MECHANICAL LOADING OF BEETROOTS
Filed Feb. 13, 1941　　　3 Sheets-Sheet 3
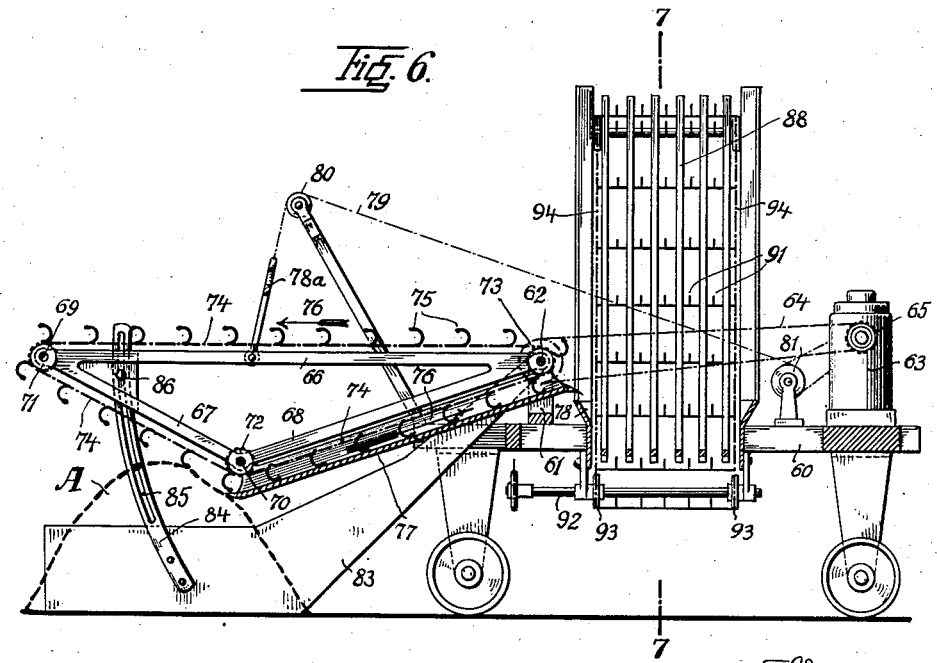
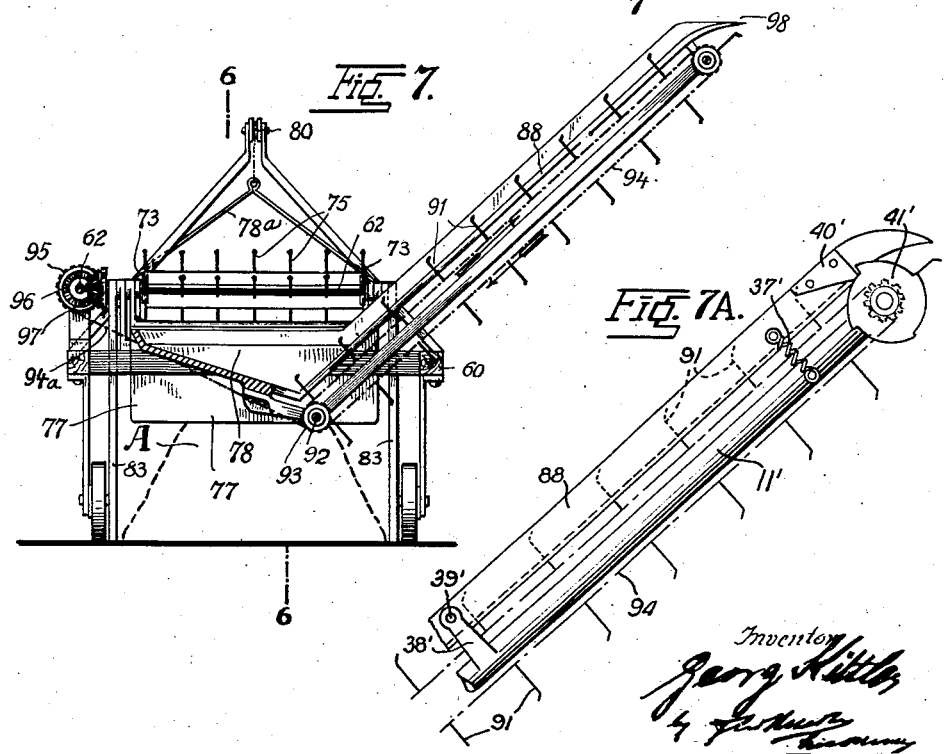

Patented June 12, 1945

2,378,144

UNITED STATES PATENT OFFICE 2,378,144

APPARATUS FOR THE MECHANICAL LOADING OF BEETROOTS

Georg Kittler, Opperau, near Breslau, Germany; vested in the Alien Property Custodian Application February 13, 1941, Serial No. 378,719½
In Germany February 5, 1940

10 Claims. (Cl. 198—11)

This invention relates to an apparatus for the mechanical loading of beetroots taken out of the earth, heaped on the field in separate heaps, said heaps being placed the one behind the other in long rows.

The loading device comprises a frame on which guide rollers for the conveying band are mounted and which carries a conveyor trough, the lower part of this frame being bent out of the direction of the conveyor trough, and the conveying band of the frame rests during the operation on the top of the heap of beetroots. In these known apparatus the frame parts which carry the conveying band and the conveyor trough are mutually secured in position during the operation, so that this loading apparatus can be advantageously employed for heapable material, that is for conveying sand, gravel, cereals and the like, but not for loading of heaps of beetroots, that is of conical heaps the diameter of which is about 1.2 meters at the bottom and the height of which is about 80 cm.

The characteristic feature of the present invention consists in that the frame, which carries the conveying band and the conveyor trough is during the loading freely oscillatable about a shaft at its upper end, so that the conveying band resting on the heap of beetroots moves downward on this heap in accordance with the decreasing height of the heap of beetroots.

Two embodiments of the invention are illustrated by way of example in the accompanying drawings, in which the first embodiment is illustrated in Figs. 1 to 5 and the second embodiment in Figs. 6 and 7.

Fig. 1 shows the loading device in side elevation partly in section,

Fig. 2 is a top plan view of Fig. 1,

Fig. 5A is a detail view showing a modified form of folding prong for use with the rake.

Fig. 6 shows the second embodiment of the invention in longitudinal section on line 6—6 of Fig. 7, Fig. 7 is a cross-section on line 7—7 of Fig. 6.

Fig. 7A is an elevation similar to the right-hand portion of Fig. 7, showing the mechanism for vibrating the conveyor trough 88.

Figure 3:
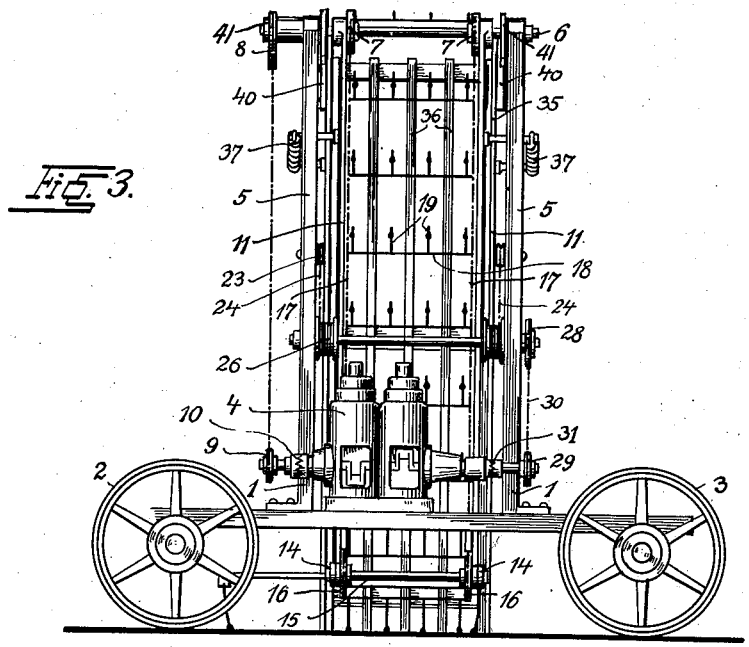
Fig. 3 is a front view of Fig. 1.

The vehicle frame 1 is of such shape that, when moved in the direction of the line in which the heaps of beetroots lie, it runs by means of its wheels 2 and 3 in straddling relation to the heaps so that these heaps of beetroots lie always freely between the wheels on this frame on which a motor 4 is fixed. In the upper ends of arms 5 of the frame a shaft 6 is journalled, which carries sprocket wheels 7 and is driven by a sprocket wheel 8 by means of a sprocket wheel 9 keyed on the driving shaft of motor 4 and adapted to be selectively engaged with or disengaged from the driving shaft.

Bars 11 are pivotally oscillatably mounted on shaft 6 and a shaft 12 with sprocket wheels 13 is journalled in the lower ends of these bars, arms 14 being pivotally mounted on shaft 12, the free ends of said arms carrying a shaft 15 on which two sprocket wheels 16 are keyed. Chains 17 on the sprocket wheels 7, 13, 16 are circulated when the sprocket wheels 8 are driven. These chains 17 are connected the one with the other by transverse rods 18 carrying prongs 19. In the arms 20 of bars 11 a shaft 21 is journalled, which carries guide rollers 22 for the chains 17. At 25 ropes 24 are attached to the bars 11 and conducted over rollers 23 to drums 26 keyed on a shaft 27, said shaft being driven from a sprocket wheel 29 of the motor shaft by means of a sprocket wheel 28 and a chain 30. This drive can be engaged or disengaged by a clutch 31.

Figure 4:
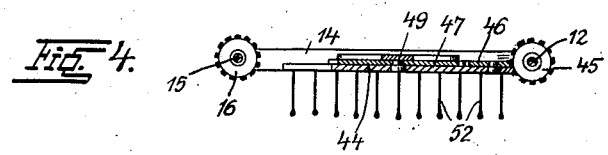
Fig. 4 illustrates a detail in section on line 4—4 of Fig. 5.
Figure 5:
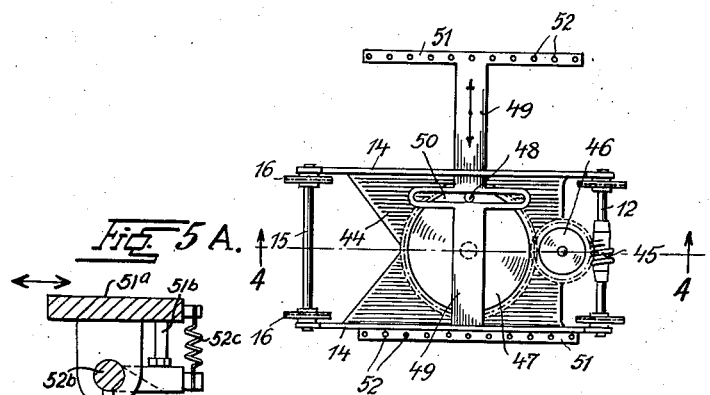
Fig. 5 illustrates this detail in top plan view.
Figure 5:
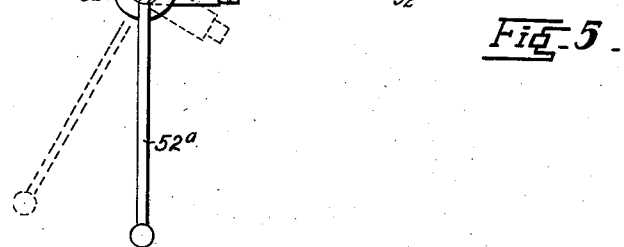

On the shaft 12, which forms the articulated connection between the frame arms 11 and the arms 14, a worm 45 is rigidly arranged as shown in Figs. 4 and 5, and a plate 44 is fixed between the arms 14, a wheel 46 cooperating with a worm 45 being removably mounted on this plate. A wheel 47 meshes with wheel 46 and is also rotatable on the plate 44. This wheel 47 has a pin 48 engaging in a guide slit 50 of a bar 49, which is guided in longitudinal direction in recesses of the bars 14. This bar 49 carries at its ends rakes 51 having prongs 52. When the shaft 12 revolves the toothed wheels 46 and 47 are also rotated by the worm 45, whereby the rakes 51, through the intermediary of the bolt 48 and the guide slit 50, are moved to and fro with bar 49. The prongs 52 of the rakes 51 may be movably arranged so that the prongs can fold over when moved in outward direction, in case they should encounter resistance. Fig. 5A shows the detailed construction of this type of prong. It is here seen that the prongs 52a have the upper ends thereof pivotally secured as at 52b to frame 51a. A stop 51b limits the rotation of the prongs about pivot 52b in one direction, i. e., when the prongs bodily move to the left in Fig. 5A, and a tension spring 52c yieldingly resists the rotation of the prongs in the opposite direction. Members 51a and 52a are similar to members 51 and 52 respectively, previously described. A conveyor trough 35 is oscillatably suspended by means of bolts 39 in the arms 38 of bars 11. The bottom of this conveyor trough is formed by laths 36 extending in the longitudinal direction of the trough. The upper part of trough 35 is connected by springs 37 with the bars 11. The conveyor trough 35 has further at its upper end projections 40, cooperating with ratchet wheels 41 fixed on shaft 6, at the rotation of which wheels a shaking movement is conveyed to the conveyor trough.

The apparatus is moved by means of the wheels 3 driven from the motor 4 and steered by the wheels 2 in a suitable manner.

The operation at the loading of the beetroots is as follows:

The bars 11 with the conveyor trough 35 and the arms 14 pivot on the shaft 6, and are adapted to be raised or lowered by means of the rope drum 26 and the ropes 24, so that the conveying device can run without hindrance over the heaps of beetroots without touching the same. The apparatus is run over the heap to be loaded so that this heap, designated by A in Fig. 1, between the wheels 2 and 3 of the frame, lies correctly under the conveying band. The conveying band is then lowered with the conveyor trough by letting go of the ropes 24 until the arms 14 of the bars 11 approximately assume the position indicated in Fig. 1 by thick dash lines. Bars 14 have limited downward pivotal movement about shaft 12. In other words, the obtuse angle between members 11 and 14 is at a maximum in the bold line position in Fig. 1. The prongs of the conveying chains which are in the range of the arms 14 rest then on the heap A of beetroots. If the conveying device is started, the conveying band transports the beetroots from the heap to the conveyor trough 35 and in this conveyor trough to the top.

The dray to be loaded with beetroots has been brought so close to the apparatus, that the upper end of the conveyor trough is lying approximately over the middle of the dray so that the conveyed beetroots can be then correctly loaded into the dray.

After the conveying device has been started, the bars 11 are lowered by gradual letting go of the ropes 24, so that the beetroots from the heap are gradually removed from above downwards. The irregularities, which might occur between the uniform lowering of the bars 11 and the not always uniform removing of the beetroots from the heap A, are equalized thereby that the arms 14 with their conveying band rest on the heap of beetroots so that they can freely move upwards and downwards.

At the starting of the conveying device the ratchet wheels 41 have also been rotated, which cooperate with the projections 40 of the conveyor trough 35, so that during the conveying a shaking movement is communicated to the conveyor trough, so that the beetroots moved along the trough are freed from adhering dirt.

The conveying chains 17 rotate the sprocket wheels 13 and with these the shaft 12 and the worm 45. Through the intermediary of the wheels 46 and 47, the guide slit 50 and the bolt 48 the bar 49 is thus moved to and fro and, during the whole time of the conveying, also the rakes 51 operate, and in such a manner that they bring back again to the conveying band the beetroots which roll off to the sides.

If the elements of the conveying device have arrived in the position shown in Fig. 1, all beetroots of the heap have been loaded in the dray. By the winding drums 26 and the ropes 24, the bars 11 with the conveyor trough 35 and the arms 14 are lifted again, and the conveying device can then be run to the next following heap of beetroots.

The movement of the arms 14 relative to the bars 11 in downward direction is preferably limited by any suitable means, so that the arms 14 cannot oscillate in downward direction relative to the bars 11 beyond the position indicated in Fig. 1 in full lines.

In this embodiment of the invention the conveying device operates on its whole length perpendicularly to the longitudinal direction of the rows of heaps of beetroots.

In the second embodiment of the invention shown in Figs. 6 and 7 the conveying device is subdivided and the lower part of the same operates in the longitudinal direction of the rows of heaps of beetroots and conveys the beetroots to the upper part, which then operates again, as in the embodiment first described, perpendicularly to the row of heaps of beetroots in order to load the beetroots into the dray.

In this form of construction a bracket 61 is mounted on the vehicle frame 60 and a shaft 62 is journalled in this bracket and driven from a motor 63 by a chain 64 and a sprocket wheel 65. The conveyor frame, composed of the elements 66, 67 and 68, is freely oscillatably mounted on shaft 62 and carries the shafts 69, 70 with the sprocket wheels 71, 72 over which the conveying chains 74 are conducted, which run over sprocket wheels 73 keyed on the driving shaft 62. Also in this instance the chains 74 are connected the one with the other by transverse bars which carry prongs 75, the chains circulating in the direction of the arrow 76 when shaft 62 revolves. A conveyor trough 77 is suspended in the frame part 68. The frame elements 66, 67, 68 hang on a bow or bail 78a to which a rope 79 is attached which is conducted by a roller 80 to a winding drum 81 rotated by the motor 63, so that the conveyor frame can be lifted and lowered.

Two boards 83 designed to engage on either side of the heap A of beetroots are oscillatable about the shaft 62. Each board 83 carries a bar 84 having a slit 85 through which engages a bolt 86 of the conveyor frame.

This part of the conveying device conveys the beetroots into a basket 78, from which extends the other part of the conveying device operating perpendicularly to the first part, said second part conveying the beetroots from the basket 78 into the dray. A shaft 92 is journalled under the basket 78 and carries sprocket wheels 93 over which conveying chains 94 are conducted. The shaft 92 is driven from shaft 62 through the intermediary of a chain 94a, a sprocket wheel 95 and bevel wheels 96, 97 and thereby moves the conveying chains 94 in the direction of the arrow shown in Fig. 7. The conveyor trough 88 is, as in the first form of construction, made of laths, but prongs 91 moved by the conveying chains engage in this instance from below between the laths, and grip the beetroots from the basket 78 and convey them on the conveyor trough 88 in upward direction, until they drop at 98 into the dray.

The operation is in this instance as follows:

With the aid of the winder 81 the rope 79 is first wound up. The bolt 86 strikes then against the upper end of the slit in the bar 84 and lifts this bar and with it the corresponding side boards 83 such a distance that the boards are lifted off the ground and the conveying device can be run without hindrance to the heap A to be loaded. The apparatus is then adjusted so that it assumes the position shown in Figs. 6 and 7 relative to the heap of beetroots A. The rope 79 is then let go again. The frame with the boards 83 descends until the boards, as shown in Figs. 6 and 7, rest on the ground at either side of the heap of beetroots. When the frame is further lowered the part of the conveying band 74 operating in the range of the frame part 67 comes to rest upon the heap of beetroots, and if then by the motor 63 the shaft 62 is revolved, the beetroots are conveyed from the heap A first into the conveyor trough 77 and on this trough in the direction of the arrow 76 into the basket 78. At the same time the sprocket wheel 95 is rotated from shaft 62 through the intermediary of the sprocket wheels 97, 96 and the shaft 92 revolved by the chain 94a, so that by the conveying band 94 and the prongs 91 the beetroots are conveyed from the basket 78 on the conveyor trough 88 into the dray. Also in this instance the conveyor trough 88 is preferably equipped with the shaking device such as described with reference to the first form of construction. Fig. 7a illustrates the shaking device for trough 88. In this figure, the elements designated by reference characters 11', 38', 39', 40' and 41' serve substantially the same function as elements 11, 38, 39, 40 and 41 respectively in the first form of the invention, shown in Figs. 1 to 5 inclusive.

The frame 66, 67, 68 descends in accordance with the decreasing height of the heap of beetroots A, so that the element 67 in the lowermost position of the frame is parallel to the ground whereupon the prongs 75 operating in its range slide along the ground and thus convey all beetroots from the heap into the conveyor trough 77 and further to the dray.

This loading of the beetroots into the dray takes place extraordinarily quickly by means of the apparatus shown in Figs. 1 to 5 or by means of the apparatus shown in Figs. 6 and 7, so that consequently considerable time is saved and also saving in wages is obtained. As further the beetroots when travelling in the conveyor trough are freed from adhering dirt, the efficiency of the vehicle from the field to the railway station is considerably greater than up to the present and the deduction made by sugar factories for the material supplied is considerably less, so that with the new conveying apparatus an extraordinarily economical progress is obtained.

The conveying apparatus according to this invention can also be employed advantageously for loading into the dray potatoes from the fields.

I claim:

1. Apparatus for the mechanical loading into a dray of beetroots heaped on the ground, comprising a vehicle frame structure, ground wheels therefor, a conveyor supported by said frame structure, a rake depending from each side of said conveyor for engaging opposite sides of said heap, whereby the top, bottom and two opposed sides of said heap will be confined, and means for moving said rakes toward and away from said conveyor to thereby laterally condense said heap into a mass beneath the conveyor.

2. A loading device according to claim 1 wherein each of said racks is pivoted, and adapted to rotate about said pivot when the rake moves away from said heap, and wherein means are provided for limiting the rotation of each of said rakes about its associated pivot when the rake is moving toward said heap.

3. Apparatus for the mechanical loading into a dray of beetroots heaped on the ground, comprising a vehicle frame structure, ground wheels therefor, an endless conveyor supported by said frame structure and adapted to rest upon said heap, a rake disposed adjacent said conveyor for engaging said heap, and means for rectilinearly moving said rake toward and away from said heap at substantially right angles to the path of travel of said conveyor to thereby condense said heap while it is being gathered by the conveyor.

4. Apparatus for the mechanical loading into a dray of beetroots heaped on the ground, comprising a vehicle framework, a conveyor frame pivotally supported by said framework, an endless conveyor mounted on said frame, the free end of said frame and associated conveyor being adapted to rest upon the top of said heap, a rake carried by said frame and disposed laterally of the line of conveyor travel for confining said beetroots beneath the conveyor, and means for moving said rake toward and away from the line of travel of the conveyor.

5. Apparatus as defined in claim 4 wherein said means for moving said rake includes a shaft, a worm on said shaft, a bolt mounted eccentrically of its axis of rotation and drive by said worm, and a reciprocable bar carrying said rake and having a guide slot into which the bolt extends.

6. Apparatus as defined in claim 4 wherein said conveyor frame is formed in two sections, said sections being pivotally connected, and means for permitting limited relative angular rotation of the sections about the connecting pivot.

7. Apparatus for the mechanical loading into a dray of beetroots heaped upon the ground, comprising a framework, an endless conveyor having one end thereof pivotally supported by said framework and having a free end adapted to rest upon the top of said heap, and pivoted confining members cooperating with said conveyor and the ground for forming an elongated passageway in which the heap is confined, the free end of each of said members being vertically movable relative to the other of said members and to the free end of said conveyor.

8. Apparatus for the mechanical loading into a dray of beetroots heaped upon the ground, comprising a framework, an endless conveyor having one end thereof pivotally supported by said framework and having a free end adapted to rest upon the top of said heap, confining members cooperating with said conveyor, each member having one end thereof pivotally secured to said framework, the free ends of said confining members adapted to rest upon the ground on opposite sides of said heap, and means connecting the free ends of said conveyor and confining members, said connecting means permitting limited relative angular movement of the conveyor and confining members about their respective pivots.

9. Apparatus as defined in claim 8 wherein cable means are connected to the free end of said conveyor for lifting the free ends of said conveyor and confining members.

10. Apparatus for the mechanical loading of beetroots heaped upon the ground into a dray comprising a framework, an endless conveyor having a substantially flat elongated collector section adapted to rest upon said heap and a substantially flat loading section projecting upwardly at an obtuse angle with the top of the collector section, means disposed at the upper end of said loading section for pivotally securing said conveyor to said framework, a pair of elongaed vertically disposed flat panels respectively connected to opposite sides of said collector section, said panels forming in conjunction with the ground and said flat collector section an elongated rectangular passageway in which said heap is confined, and means for driving said conveyor to transfer the beetroots in said heap from said passageway to said loading section.

GEORG KITTLER.